(12) United States Patent
Bessler

(10) Patent No.: US 6,196,011 B1
(45) Date of Patent: Mar. 6, 2001

(54) REFRIGERATION SYSTEM WITH INDEPENDENT COMPARTMENT TEMPERATURE CONTROL

(75) Inventor: Warren Frank Bessler, Amsterdam, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/441,322

(22) Filed: Nov. 16, 1999

(51) Int. Cl.$^7$ ........................................ F25D 17/04
(52) U.S. Cl. .................................. 62/186; 62/177
(58) Field of Search .......................... 62/186, 177, 178, 62/187, 208

(56) References Cited

U.S. PATENT DOCUMENTS

| | | | |
|---|---|---|---|
| 3,382,683 | * 5/1968 | Wiljanen | ................................ 62/186 |
| 3,877,243 | * 4/1975 | Kramer | .................................. 62/180 |
| 3,918,269 | * 11/1975 | Summers et al. | ........................ 62/180 |
| 5,255,530 | 10/1993 | Janke . | |
| 5,355,686 | * 10/1994 | Weiss | ....................................... 62/89 |
| 5,471,849 | * 12/1995 | Bessler | .................................. 62/186 |
| 5,531,078 | 7/1996 | Day et al. . | |
| 5,586,445 | 12/1996 | Bessler . | |
| 5,669,222 | 9/1997 | Jaster et al. . | |
| 5,899,083 | * 5/1999 | Peterson et al. | ........................ 62/186 |

* cited by examiner

Primary Examiner—Corrine McDermott
Assistant Examiner—Marc Norman
(74) Attorney, Agent, or Firm—Patrick K. Patnode; Marvin Snyder

(57) ABSTRACT

A refrigeration system is disposed within an outer cabinet having a freezer compartment and a fresh food compartment connected via a mullion opening. A compressor, a condenser, an expansion device and a freezer evaporator are connected in series to expand and condense a refrigerant to cool the compartments. A freezer compartment temperature sensor and a fresh food compartment temperature sensor are provided to sense compartment temperatures. A discrete speed freezer compartment fan directs cooling air throughout the freezer compartment and through the mullion opening to the fresh food compartment. A controller generates control signals to the discrete speed evaporator fan to operate at high speed if either the fresh food compartment or both the freezer and fresh food compartments demand cooling and at a low speed if only the freezer compartment demands cooling.

19 Claims, 1 Drawing Sheet

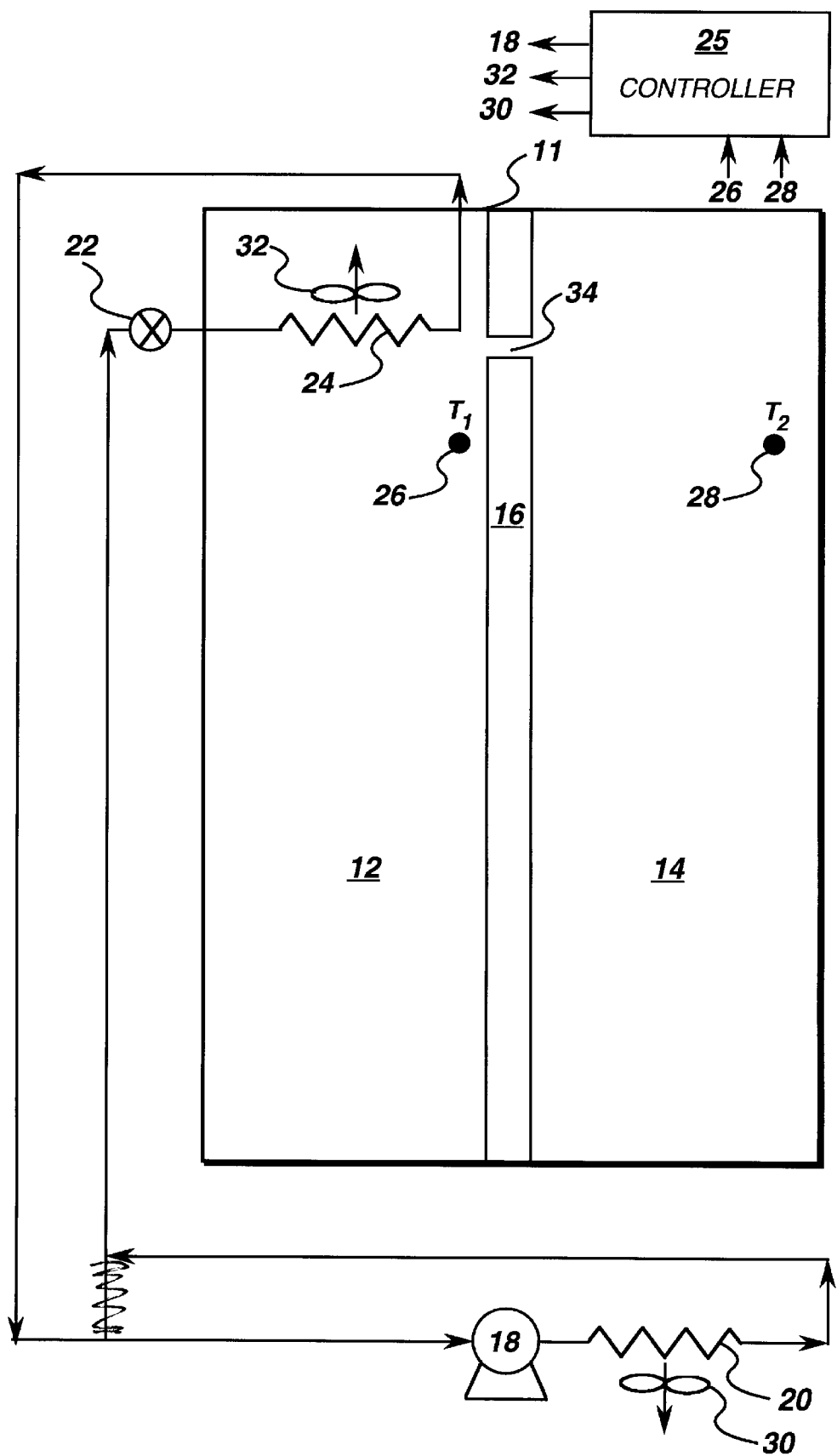

REFRIGERATION SYSTEM WITH INDEPENDENT COMPARTMENT TEMPERATURE CONTROL

BACKGROUND OF THE INVENTION

This invention relates to refrigeration systems and more specifically to refrigeration systems with independent compartment temperature control.

Household refrigerators typically operate on a simple vapor compression cycle. Such a cycle typically includes a compressor, a condenser, an expansion device and an evaporator connected in series and charged with a refrigerant. The evaporator is a specific type of heat exchanger that transfers heat from air passing over the evaporator to refrigerant flowing through the evaporator, thereby causing the refrigerant to vaporize. The cooled air is then used to refrigerate one or more freezer or fresh food compartments.

Household refrigerators are expected to operate over a range of ambient temperatures, typically from about 55° F. to about 90° F. System users are typically supplied control knobs to adjust Fresh Food and Freezer compartment temperatures. At each combined setting of the control knobs, there is a target set of Fresh Food and Freezer temperatures that an ideal refrigerator should achieve, independent of ambient conditions. Different hardware and control strategies attempt to approximate this ideal performance matrix.

Typically a control device is used to regulate airflow to the fresh food compartment to account for the changing load split between freezer and fresh food sections. During high ambient temperature and frequent fresh food access, more airflow to the fresh food section is required to maintain target temperatures. Manual damper air control cannot automatically compensate for changing loads and is prone to customer misadjustment. Motorized damper airflow modulation, powered by a system controller, is prone to malfunction (i.e. freeze up) and may cause adverse temperature gradients during low ambient operation.

Accordingly, there is a need in the art for an improved refrigeration system for achieving ideal performance temperatures of fresh food and freezer compartments.

SUMMARY OF THE INVENTION

A refrigeration system is disposed within an outer cabinet having a freezer compartment and a fresh food compartment connected via a mullion opening. A compressor, a condenser, an expansion device and a freezer evaporator are connected in series to expand and condense a refrigerant to cool the compartments. A freezer compartment temperature sensor and a fresh food compartment temperature sensor are provided to sense compartment temperatures. A discrete speed evaporator fan directs cooling air throughout the freezer compartment and through the mullion opening to the fresh food compartment. A controller generates control signals to the discrete speed evaporator fan to operate at high speed if either the fresh food compartment or both the freezer and fresh food compartments demand cooling and to operate at low speed if the freezer compartment alone demands cooling.

BRIEF DESCRIPTION OF THE DRAWINGS

The FIGURE is a schematic cross-sectional side elevation view of an illustrative embodiment of the instant invention.

DETAILED DESCRIPTION OF THE INVENTION

An exemplary embodiment of a refrigeration system 10 includes an outer cabinet 11 having a Freezer compartment 12 and a Fresh Food compartment 14, as shown in FIG. 1. A mullion 16 separates Freezer compartment 12 and Fresh Food compartment 14. Although the present invention is described herein in connection with refrigeration system 10, the present invention is not limited to practice with refrigeration system 10. In fact, the present invention can be implemented and utilized with many other configurations.

Freezer and Fresh Food compartments 12, 14 typically comprise a housing formed with thermally insulated walls provided with an opening or a door for placement or removal of articles.

Refrigeration system 10 further comprises a compressor 18, a condenser 20, an expansion device 22 and an evaporator 24. Compressor 18 is electrically coupled to a controller 25. As is customary, refrigeration system 10 is provided in thermal association with the freezer or fresh food compartment, having several components of refrigeration system 10 mounted on or in the housing containing the freezer or fresh food compartment and adapted with the freezer and fresh food compartment 12, 14 to cool the interior thereof.

A freezer compartment temperature sensor 26 and a fresh food compartment temperature sensor 28 are disposed within freezer compartment 12 and fresh food compartment 14, respectively, to sense compartment temperatures. Temperature sensors 26, 28 typically comprise solid state sensors such as resistance temperature detectors (RTD), thermocouples, thermistors or the like. Each temperature sensor 26, 28 is electronically coupled to controller 25.

For purposes of clarity, in one embodiment, the operation of refrigeration system 10 will be discussed in terms of a FREEZER MODE and a FRESH FOOD MODE. Although exemplary embodiments will be discussed in terms of a FREEZER MODE, and a FRESH FOOD MODE, the invention is not limited to these modes. In fact, the present invention can be implemented and utilized with many other modes of operation.

During operation, freezer compartment temperature sensor 26 and fresh food compartment sensor 28 generate temperature signals, which temperature signals are received by controller 25.

If the temperature signals ($T_1$) generated by freezer compartment temperature sensor 26 rise above a preset freezer compartment temperature, typically in the range between about −20° C. to about −15° C., controller 25 enters FREEZER MODE.

During FREEZER MODE, controller 25 generates a signal to activate compressor 18, a condenser fan 30 and a freezer compartment fan 32. In one embodiment, freezer compartment fan 32 is a two-speed fan, having two discrete fan speeds: HIGH and LOW. In another embodiment, freezer compartment fan 32 is a three-speed fan having three discrete fan speeds: HIGH, MEDUIM, and LOW. High-pressure gaseous refrigerant is discharged from compressor 18 and is condensed in condenser 20. The now-liquid refrigerant is expanded through expansion device 22 to a lower pressure and flows to evaporator 24. The refrigerant under low pressure, and correspondingly at a low temperature, enters evaporator 24 where the refrigerant is evaporated in a conventional manner. The evaporation of the refrigerant lowers the temperature of the air surrounding evaporator 24. The cooled air is directed by the rotation of freezer compartment fan 32 about freezer compartment 12.

If the temperature signals ($T_1$) generated by freezer compartment temperature sensor 26 drop below the preset freezer compartment temperature, cooling is no longer required and controller 25 exits FREEZER MODE.

If the Temperature signals ($T_2$) generate d by fresh food compartment temperature sensor 28 rise above a preset fresh food compartment temperature, typically in the range between about 3° C. to about 7° C., controller enters FRESH FOOD MODE.

During FRESH FOOD MODE, controller 25 generates a signal to activate compressor 18, condenser fan 30 and freezer compartment fan 32. High-pressure gaseous refrigerant is discharged from compressor 18 and is condensed in condenser 20. The now-liquid refrigerant is expanded through expansion device 22 to a lower pressure and flows to evaporator 24. The refrigerant under low pressure, and correspondingly at a low temperature, enters evaporator 24 where the refrigerant is evaporated in a conventional manner. The evaporation of the refrigerant lowers the temperature of the air surrounding evaporator 24. The cooled air is directed by the rotation of freezer compartment fan 32 through an opening 34 in mullion 16 to fresh food compartment 14.

If the temperature signals ($T_2$) generated by fresh food compartment temperature sensor 28 drop below the preset fresh food compartment temperature, cooling is no longer required and controller 25 exits FRESH FOOD MODE.

In accordance with one embodiment of the instant invention, the speed of freezer compartment fan 32 is changed by controller 25 depending on the cooling needs of either freezer compartment 12 or fresh food compartment 14. A FREEZER MODE only condition indicates a low speed fan is appropriate to prevent overcooling of the fresh food compartment. A FRESH FOOD MODE only status indicates a high speed fan is appropriate to maximize cooling of the fresh food compartment while limiting overcooling of the freezer. When both modes are active, the medium fan speed is used in the three-speed embodiments, and the high speed fan is used in the two-speed embodiments.

One benefit derived from this invention is the elimination of the air damper between the freezer and fresh food compartments. A discreet multi-speed freezer compartment fan 32 is used instead to control the relative cooling supply between freezer compartment 12 and fresh food compartment 14.

In another embodiment of the instant invention, freezer compartment fan 32 is a two-speed freezer compartment fan 32 having two discrete speeds: HIGH and LOW. High speed is the normal operating mode as high speed is a compromise between noise and peak load performance. Controller 25 activates the hermetic loop in high speed mode as this is the most efficient operating point. In this embodiment, only freezer temperature sensor 28 can activate the hermetic loop.

If the temperature signals ($T_1$) generated by freezer compartment temperature sensor 26 rise above the preset freezer compartment temperature, typically in the range between about −20° C. to about −15° C., controller 25 generates a signal to activate compressor 18 and freezer compartment fan 32. Freezer compartment fan 32 is activated in high speed.

Next, controller 25 monitors fresh food compartment temperature sensor 28. If the temperature signals ($T_2$) generated by fresh food compartment temperature sensor 28 are above a preset fresh food compartment temperature, typically in the range between about 3° C. to about 7° C., controller 25 maintains the speed of freezer compartment fan 32 at high.

If the temperature signals ($T_2$) generated by fresh food compartment temperature sensor 28 drop below the preset fresh food compartment temperature, cooling is no longer required in fresh food compartment 14. Controller 25 then monitors freezer compartment temperature sensor 26 to determine if freezer compartment 12 still requires cooling. If freezer compartment 12 requires additional cooling, freezer compartment fan 32 is slowed to low speed until the temperature signals ($T_1$) generated by freezer compartment temperature sensor drop below the preset freezer compartment temperature, cooling is no longer required and controller 25 generates a signal to stop compressor 18 and freezer compartment fan 32.

As discussed above, in this embodiment, if freezer compartment temperature sensor 26 indicates cooling of freezer compartment 12 is needed, the freezer compartment fan 32 is activated in high speed. If controller 25 monitors fresh food compartment temperature sensor 28 and fresh food compartment cooling is not required, controller 25 slows the speed of freezer compartment fan 32 to low until freezer compartment 12 is cooled.

In one embodiment, only freezer temperature sensor 28 can activate the hermetic loop unless an "alarm limit" is reached by fresh food compartment 14, for example, 2° C. to 5° C. above the preset fresh food compartment temperature. If an "alarm limit" is indicated by fresh food temperature sensor 28, freezer compartment fan 32 is started in high speed and the cooled air about evaporator 24 is directed by the rotation of freezer compartment fan 32 through opening 34 in mullion 16 to fresh food compartment 14.

Freezer compartment fan 32 operating at low speed does not significantly impact the temperature of fresh food compartment 14. The low speed operation of freezer compartment fan 32 does not generate enough flow pressure to deliver significant airflow through opening 34 in mullion 16 between freezer compartment 12 and fresh food compartment 14. Accordingly, low speed fan operation is primarily used for low temperature ambient conditions or to trim the temperature of freezer compartment 12 lower when fresh food compartment 14 requires no cooling.

In another embodiment of the instant invention, freezer compartment fan 32 is a three-speed freezer evaporator fan having three discrete speeds: HIGH; MEDIUM; and LOW. Medium speed is the normal operating mode as medium speed is appropriate for normal ambient operation and provides quiet operation that is desirable for typical kitchen use. Controller 25 activates the hermetic loop in medium fan speed unless a high ambient temperature is detected or a quick chill ("turbo cool") of fresh food compartment 14 is selected by an end-user. In each of these cases, controller 25 activates the hermetic loop in high speed as a starting speed. High speed is used to deliver maximum fresh food cooling if medium fan speed is not capable of achieving set point temperature control in fresh food compartment 14 prior to freezer compartment 12 being satisfied. Low speed is used in a manner identical to that of the two-speed evaporator fan logic.

In another embodiment of the instant invention, both the two-speed and the three-speed freezer compartment fan 32 embodiments use the temperature set point of freezer compartment 12 to initiate the hermetic loop cooling and the satisfaction of both freezer compartment 12 and fresh food compartment 14 set points to terminate the hermetic loop. Transition to a lower fan speed occurs when fresh food compartment 14 cooling is satisfied prior to freezer compartment 12 cooling requirements. Transition to a higher fan speed occurs when the cooling of freezer compartment is satisfied prior to the cooling of fresh food compartment 14.

While only certain features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A refrigeration system disposed within an outer cabinet having a freezer compartment and a fresh food compartment connected via a mullion opening, said refrigeration system comprising:
   a compressor, a condenser, an expansion device, and a freezer evaporator connected in series to expand and condense a refrigerant to cool said freezer compartment and said fresh food compartment;
   a discrete speed freezer compartment fan disposed adjacent said freezer evaporator for directing cooled air throughout said freezer compartment and through said mullion opening to said fresh food compartment; and
   a controller coupled to said compressor and said discrete speed freezer compartment fan to provide control signals thereto and to said compartment temperature sensors to receive temperature signals therefrom;
   wherein said controller generates control signals to said discrete speed freezer compartment fan to operate at a first high speed if said freezer compartment and said fresh food compartment demand cooling or if said fresh food compartment demands cooling and at a second low speed if only said freezer compartment demands cooling.

2. A refrigeration system in accordance with claim 1 wherein said compartment temperature sensors are solid state sensors.

3. A refrigeration system in accordance with claim 1 wherein said refrigeration system operates in a FREEZER MODE and a FRESH FOOD MODE.

4. A refrigeration system in accordance with claim 4 wherein said temperature signals ($T_1$) generated by said freezer compartment temperature sensor rise above a preset freezer compartment temperature and said controller enters FREEZER MODE.

5. A refrigeration system in accordance with claim 4 wherein said preset freezer compartment temperature is in the range between about −20° C. to about −15° C.

6. A refrigeration system in accordance with claim 4 wherein said temperature signals generated by said freezer compartment temperature sensor drop below said preset freezer compartment temperature and said controller exits FREEZER MODE as cooling is no longer needed.

7. A refrigeration system in accordance with claim 1 wherein temperature signals ($T_2$) generated by said fresh food compartment temperature sensor rise above a preset fresh food compartment temperature and said controller enters FRESH FOOD MODE.

8. A refrigeration system in accordance with claim 7 wherein said preset fresh food compartment temperature is in the range between about 3° C. to about 7° C.

9. A refrigeration system in accordance with claim 7 wherein said temperature signals generated by said fresh food compartment temperature sensor drop below said preset fresh food compartment temperature said controller exits FRESH FOOD MODE as cooling is no longer needed.

10. A refrigeration system disposed within an outer cabinet having a freezer compartment and a fresh food compartment connected via a mullion opening, said refrigeration system comprising:
    a compressor, a condenser, an expansion device, and a freezer evaporator connected in series to expand and condense a refrigerant to cool said freezer compartment and said fresh food compartment;
    a two-speed discrete speed freezer compartment fan having two discrete speeds HIGH and LOW wherein said fan is disposed adjacent said freezer evaporator for directing cooled air throughout said freezer compartment and through aid mullion opening to said fresh food compartment; and
    a controller coupled to said compressor and said discrete speed freezer compartment fan to provide control signals thereto and to said compartment temperature sensors to receive temperature signals therefrom;
    wherein said controller generates control signals to said discrete speed freezer compartment fan to operate at HIGH speed if said freezer compartment temperature sensor demands cooling.

11. A refrigeration system in accordance with claim 10, wherein said controller monitors fresh food compartment temperature sensor to detect if fresh food compartment cooling is required.

12. A refrigeration system in accordance with claim 11, wherein said controller detects fresh food cooling is not required and said freezer compartment fan is slowed to LOW speed until said freezer compartment is cooled below a set point temperature.

13. A refrigeration system in accordance with claim 10, wherein only said freezer temperature sensor can activate said controller unless an alarm temperature limit is detected by said fresh food temperature sensor.

14. A refrigeration system in accordance with claim 13, wherein said alarm limit is in the range between about 2° C. to 5° C. above a preset temperature.

15. A refrigeration system disposed within an outer cabinet having a freezer compartment and a fresh food compartment connected via a mullion opening, said refrigeration system comprising:
    a compressor, a condenser, an expansion device, and a freezer evaporator connected in series to expand and condense a refrigerant to cool said freezer compartment and said fresh food compartment;
    a three-speed discrete speed freezer compartment fan having three discrete speeds, HIGH, MEDIUM and LOW, wherein said fan is disposed adjacent said freezer evaporator for directing cooled air throughout said freezer compartment and through said mullion opening to said fresh food compartment;
    a controller coupled to said compressor and said discrete speed freezer compartment fan to provide control signals thereto and to said compartment temperature sensors to receive temperature signals therefrom;
    wherein said controller generates control signals to said discrete speed evaporator fan to operate at MEDIUM speed if said freezer compartment temperature sensor demands cooling.

16. A refrigeration system in accordance with claim 15, wherein said controller monitors fresh food compartment temperature sensor to detect if fresh food compartment cooling is required.

17. A refrigeration system in accordance with claim 16, wherein said controller detects fresh food cooling is not required and said freezer compartment fan is slowed to LOW speed until said freezer compartment is cooled below a set point temperature.

18. A refrigeration system in accordance with claim 15 wherein only said freezer temperature sensor can activate said controller unless an alarm temperature limit is detected by said fresh food temperature sensor.

19. A refrigeration system in accordance with claim 18, wherein said alarm limit is in the range between about 2° C. to 5° C. above a preset temperature.

* * * * *